United States Patent
Duge

(10) Patent No.: US 9,541,003 B2
(45) Date of Patent: Jan. 10, 2017

(54) AIR PARTICLE SEPARATOR

(71) Applicant: Rolls-Royce Corporation, Indianapolis, IN (US)

(72) Inventor: Robert T. Duge, Carmel, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 568 days.

(21) Appl. No.: 14/178,586

(22) Filed: Feb. 12, 2014

(65) Prior Publication Data

US 2014/0241850 A1 Aug. 28, 2014

Related U.S. Application Data

(60) Provisional application No. 61/768,440, filed on Feb. 23, 2013.

(51) Int. Cl.
| | |
|---|---|
| *F02C 7/05* | (2006.01) |
| *F02C 7/052* | (2006.01) |
| *F04D 29/70* | (2006.01) |
| *F01D 25/32* | (2006.01) |
| *F01D 25/00* | (2006.01) |

(52) U.S. Cl.
CPC .............. *F02C 7/052* (2013.01); *F01D 25/002* (2013.01); *F01D 25/32* (2013.01); *F04D 29/701* (2013.01)

(58) Field of Classification Search
CPC ........ F02C 7/052; F01D 25/002; F01D 25/32; F04D 29/701
See application file for complete search history.

(56) References Cited

U.S. PATENT DOCUMENTS

| | | | | |
|---|---|---|---|---|
| 3,534,548 A | * | 10/1970 | Connors | ................. F02C 7/042 |
| | | | | 415/116 |
| 3,766,719 A | * | 10/1973 | McAnally, III | ......... F02C 7/052 |
| | | | | 244/53 B |
| 3,811,254 A | * | 5/1974 | Amelio | .................. B01D 45/12 |
| | | | | 417/197 |
| 3,977,811 A | * | 8/1976 | Kuintzle, Jr. | ......... F04D 23/005 |
| | | | | 137/15.1 |
| 3,993,463 A | * | 11/1976 | Barr | ....................... B01D 45/16 |
| | | | | 244/53 B |
| 4,265,646 A | | 5/1981 | Weinstein et al. | |
| 4,463,552 A | | 8/1984 | Monhardt et al. | |
| 4,702,071 A | * | 10/1987 | Jenkins | .................... F02C 7/052 |
| | | | | 415/121.2 |
| 4,881,367 A | | 11/1989 | Flatman | |
| 4,928,480 A | * | 5/1990 | Oliver | .................... B64D 33/02 |
| | | | | 55/306 |
| 5,279,109 A | | 1/1994 | Liu et al. | |
| 6,698,180 B2 | | 3/2004 | Snyder | |
| 7,581,397 B2 | | 9/2009 | Strangman et al. | |
| 7,624,581 B2 | | 12/2009 | Moniz | |
| 7,678,165 B2 | | 3/2010 | Tingle et al. | |
| 2008/0156187 A1 | | 7/2008 | Tingle et al. | |

* cited by examiner

*Primary Examiner* — Igor Kershteyn

(74) *Attorney, Agent, or Firm* — Barnes & Thornburg LLP

(57) ABSTRACT

A gas turbine engine is disclosed having a particle separator and an ejector disposed downstream of the particle separator and structured to entrain a dirty flow from the separator. A container of working fluid can be placed in flow communication with the ejector to provide an ejector flow to entrain the dirty flow from the particle separator. Alternatively and/or additionally, the ejector can be configured to use a flow of working fluid from the gas turbine engine as an ejector flow.

20 Claims, 3 Drawing Sheets

AIR PARTICLE SEPARATOR

CROSS REFERENCE TO RELATED APPLICATIONS

This application claims priority to and the benefit of U.S. Provisional Patent Application No. 61/768,440, filed 23 Feb. 2013, the disclosure of which is now expressly incorporated herein by reference.

TECHNICAL FIELD

The present disclosure generally relates to engine air particle separators. More particularly, but not exclusively, the present disclosure generally relates to gas turbine engine air particle separators.

BACKGROUND

Separating foreign materials from a flow stream for gas turbine engines remains an area of interest. Some existing systems have various shortcomings relative to certain applications. Accordingly, there remains a need for further contributions in this area of technology.

SUMMARY

One embodiment of the present disclosure is a unique air particle separator for a gas turbine engine. Other embodiments include apparatuses, systems, devices, hardware, methods, and combinations for separating foreign materials from a flow stream for a gas turbine engine. Further embodiments, forms, features, aspects, benefits, and advantages of the present application shall become apparent from the description and figures provided herewith.

DETAILED DESCRIPTION OF THE ILLUSTRATIVE EMBODIMENTS

Figure 1:
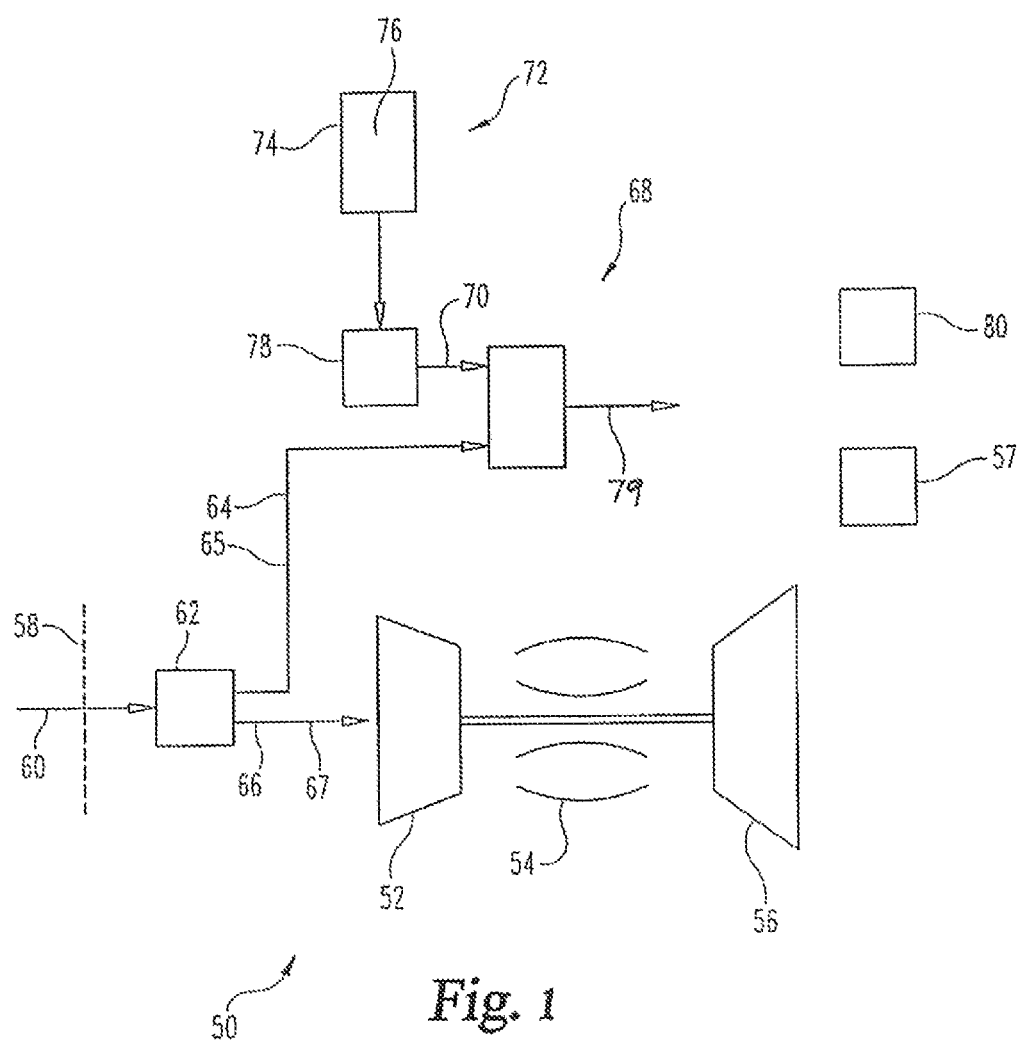
FIG. 1 depicts an embodiment of an air particle separator used with a gas turbine engine.

For the purposes of promoting an understanding of the principles of the disclosure, reference will now be made to the embodiments illustrated in the drawings and specific language will be used to describe the same. It will nevertheless be understood that no limitation of the scope of the disclosure is thereby intended. Any alterations and further modifications in the described embodiments, and any further applications of the principles of the disclosure as described herein are contemplated as would normally occur to one skilled in the art to which the disclosure relates.

With reference to FIG. 1, a gas turbine engine 50 is disclosed having a compressor 52, a combustor 54, and a turbine 56. An air particle separator 62 is used with the gas turbine engine 50 to provide a relatively clean flow 67 for use within the engine, as will be described in more detail below. The gas turbine engine 50 is shown as a single spool turbojet engine in the illustrative embodiment. In other embodiments, however, the gas turbine engine 50 can have any number of spools and can take on a variety of forms such as, but not limited to, a turbofan, turboprop, and turboshaft. The gas turbine engine 50 is used to provide power to an aircraft 57 or other vehicle, whether the power is in the form of propulsive power, mechanical power, or electrical power, to set forth just a few non-limiting examples.

As used herein, the term "aircraft" includes, but is not limited to, helicopters, airplanes, unmanned space vehicles, fixed wing vehicles, variable wing vehicles, rotary wing vehicles, unmanned combat aerial vehicles, tailless aircraft hover crafts, and other airborne and/or extraterrestrial (spacecraft) vehicles. Further, the present disclosure is contemplated for utilization in other applications that may not be coupled with an aircraft such as, for example, industrial applications, power generation, pumping sets, naval propulsion, weapon systems, security systems, perimeter defense/security systems, and the like known to one of ordinary skill in the art.

An inlet 58 provides a working fluid 60 to the gas turbine engine 50 for purposes of combustion, among other possible uses. In one form, the working fluid 60 is air. The inlet 58 can take a variety of shapes and can provide a range of flow rates to the gas turbine engine 50. The inlet 58 is designated as a dashed line and can represent any structure or location which represents an entrance of a flow that is to be used either wholly or partially within the gas turbine engine 50.

The gas turbine engine 50 is in flow communication with a particle separator 62 that is used to separate foreign material such as particulate matter from the working fluid 60 before it is used in the gas turbine engine 50. The particle separator 62 can be used to remove foreign material from the working fluid 60, but, in some forms, the particle separator 62 may leave some amount of particulate matter in a flow stream routed through the gas turbine engine 50. The particle separator 62 can have a variety of forms, shapes, and/or configurations useful to separate the foreign material.

In one non-limiting form, the particle separator 62 includes an internal geometry that creates a bifurcated flow path, wherein one of the flow paths is turned greater than the other. A momentum of some or all of the foreign material carries the material into one of the flow paths to establish a dirty flow path 64 while a cleaned form of the working fluid 60 is carried into the other of the flow paths to establish a clean flow path 66. The clean flow path 66 usually includes a greater turning than the dirty flow path 64 such that the momentum of the foreign material carries it into the less turned, dirty flow path 64. Various other geometries, forms, and/or techniques can be used to separate some or all of the foreign material so that the gas turbine engine 50 receives a relatively clean flow of working fluid 60.

The dirty flow path 64 extends between the particle separator 62 and an ejector 68 which is arranged to attract foreign material from the particle separator 62. Any number of ejectors 68 can be used throughout the gas turbine engine 50 and can have any variety of spacing. In one embodiment the ejector 68 receives a dirty flow 65 from the dirty flow path 64 and a flow stream 70 from a flow source 72 and operates by entraining the dirty flow 65 with the flow stream 70, in one form the streams are entrained with one another by flowing the flow stream 70 at sufficiently low pressures and/or sufficiently high velocity to encourage the dirty flow 65 toward the ejector 68.

The ejector 68 can have a variety of forms, constructions, flow geometries, etc. to accomplish the entrainment of the flow stream 70 and dirty flow 65. In some embodiments, the ejector 68 can be capable of receiving a flow stream from a source other than the flow source 72, an embodiment of which is described below. Downstream of the entrainment of the streams, the ejector 68 provides an ejection flow 79 which includes the foreign material and flow stream 70. The ejection flow 79 can be dumped overboard of the gas turbine engine 50 or other structure, such as, but not limited to, an aircraft coupled to it.

The flow source 72 is a container 74 capable of holding a container fluid 76. When the container fluid 76 is dispensed from the container 74, it forms the flow stream 70 that is entrained with the dirty flow 65 discussed above. The container fluid 76 can be held within the container 74 at a relatively elevated pressure and, in one embodiment, the fluid 76 is a working fluid such as air. In some embodiments, the container 74 can hold the container fluid 76 and one or more other fluids and/or objects. For example, in one embodiment, the container 74 can include a bladder that contains the container fluid 76. In other embodiments, the container fluid 76 can be a mixture of various fluids. Other variations are also contemplated herein.

The container fluid 76 can be delivered to the container 74 at a variety of times relative to operation of the gas turbine engine 50. For example, the container fluid 76 can be provided to the container 74 by ground servicing personnel during periods in which the gas turbine engine 50 is not operated. Alternatively the container fluid 76 can be delivered to the container 74 during operation of the gas turbine engine 50. Such a delivery could be accomplished by charging the container 74 with compressor air bled from the gas turbine engine 50, to set forth just one non-limiting example. In some applications, the container fluid 76 can be delivered to the container 74 in stages. For example, some portion of the container fluid 76 can be delivered when the gas turbine engine 50 is not operated while another portion of the container fluid 76 can be delivered during operation of the engine.

The container 74 can be made of a variety of materials and can take a variety of forms. The container 74 is capable of holding the container fluid 76 at a range of volumes, temperatures, and pressures. In one non-limiting embodiment, the container fluid 76 is air. In other embodiments, the container fluid can be any other suitable fluid capable of being pressurized and dispensed to the ejector 68.

In the illustrative form, a valve 78 can be used to activate and/or regulate a flow of the container fluid 76 to form the flow stream 70. The valve 78 can be a mechanical valve, electromechanical valve, hydraulic valve, or electric valve, among potential others. The valve can be capable of being positioned between extremes or at intermediate points between the extremes. In addition, the valve can be placed at discrete positions between the extremes or at an infinite number of positions between the extremes. In one application, the extremes can be a fully open position and a fully closed position, but it will be appreciated that, in some forms, the extremes can include either or both of a partially open and a partially closed position. A variety of valve types and operating positions are contemplated herein.

A controller 80 can be used to monitor and/or control the operation of the valve 78, and by extension the operation of the ejector 68. The controller 80 can be comprised of digital circuitry, analog circuitry, or a hybrid combination of both of these types. The controller 80 can be programmable, an integrated state machine, or a hybrid combination thereof. The controller 80 can include one or more Arithmetic Logic Units (ALUs), Central Processing Units (CPUs), memories, limiters, conditioners, filters, format converters, or the like which are not shown to preserve clarity. In one form, the controller 80 is of a programmable variety that executes algorithms and processes data in accordance with operating logic that is defined by programming instructions (such as software or firmware). Alternatively or additionally, operating logic for the controller 80 can be at least partially defined by hardwired logic or other hardware. In one particular form, the controller 80 is configured to operate as a Full Authority Digital Engine Control (FADEC); however, in other embodiments it may be organized/configured in a different manner as would occur to those skilled in the art. It should be appreciated that controller 80 can be exclusively dedicated to control of the valve 78, or may further be used in the regulation/control/activation of one or more other subsystems or aspects of the aircraft 57.

In one mode of operation, the flow source 72 can be activated for purposes of starting the gas turbine engine 50 so that the flow stream 70 from the container 74 is used to encourage foreign material toward the ejector 68 and discourage flow of the foreign material into gas turbine engine 50. The flow source 72 can be activated by the controller 80 or other device, such as, but not limited to, an operator switch. In one form, the controller 80 can be cued to a pilot switch, operating logic, etc. to initiate the flow of the flow stream 70. The flow source can be activated either before the gas turbine engine 50 spin up to operating speed has begun or during spin up. To set forth just one non-limiting example, as the engine begins to spin up and as particle separator become effective in separating foreign material from the working fluid 60, the flow source 72 can be activated to flow the flow stream 70 so that foreign material is encouraged toward the ejector 68 and further away from the gas turbine engine 50. In other modes of operation, the flow source 72 can also be activated during operation of the gas turbine engine 50 if needed or desired.

In some forms, the container 74 can be an accumulator which is capable of storing the container fluid 76 for a duration of time. In some applications, the container 74 can hold the container fluid 76 for a period of time that extends past a time in which the engine is shut down. In other applications, the container 74 can hold the container fluid 76 for multiple engine starts in which case the flow source 72 may only be activated when environmental conditions require. In still other applications, the container 74 can be charged and hold the container fluid 76 long enough for the gas turbine engine to be started. In short, the container 74 can hold the container fluid 76 for a variety of durations.

Figure 2:
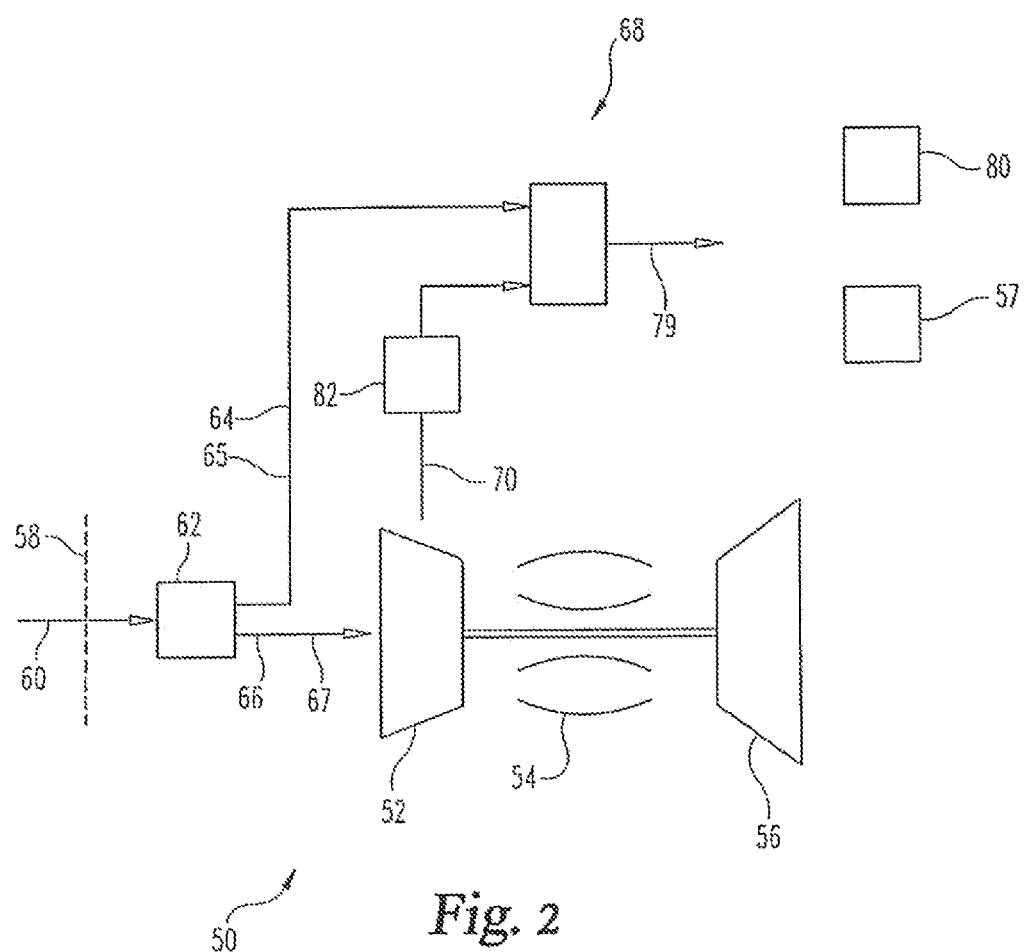
FIG. 2 depicts an embodiment of an air particle separator used with a gas turbine engine.

To set forth another non-limiting embodiment, FIG. 2 discloses a form of the ejector 68 which receives a flow stream from a portion of the gas turbine engine such as the compressor 52. In other embodiments, the flow stream from the gas turbine engine 50 can originate from other locations. The illustrated embodiment includes a valve 82 that can be used to, activate and/or regulate a flow of fluid from the gas turbine engine to form the flow stream 70. The valve 82 can be a mechanical valve, electromechanical valve, hydraulic valve, or electric valve, among potential others. The valve 82 can be capable of being positioned between extremes or at intermediate points between the extremes. In addition, the valve 82 can be placed at discrete positions between the extremes or at an infinite number of positions between the extremes.

In one application the extremes can be a fully open position and a fully closed position, but it will be appreciated that, in some forms, the extremes can include either or both of a partially open and a partially closed position. A variety of valve types and operating positions are contemplated herein. The valve 82 can be controlled by the controller 80 (shown in FIG. 1) or other mechanism.

Figure 3:
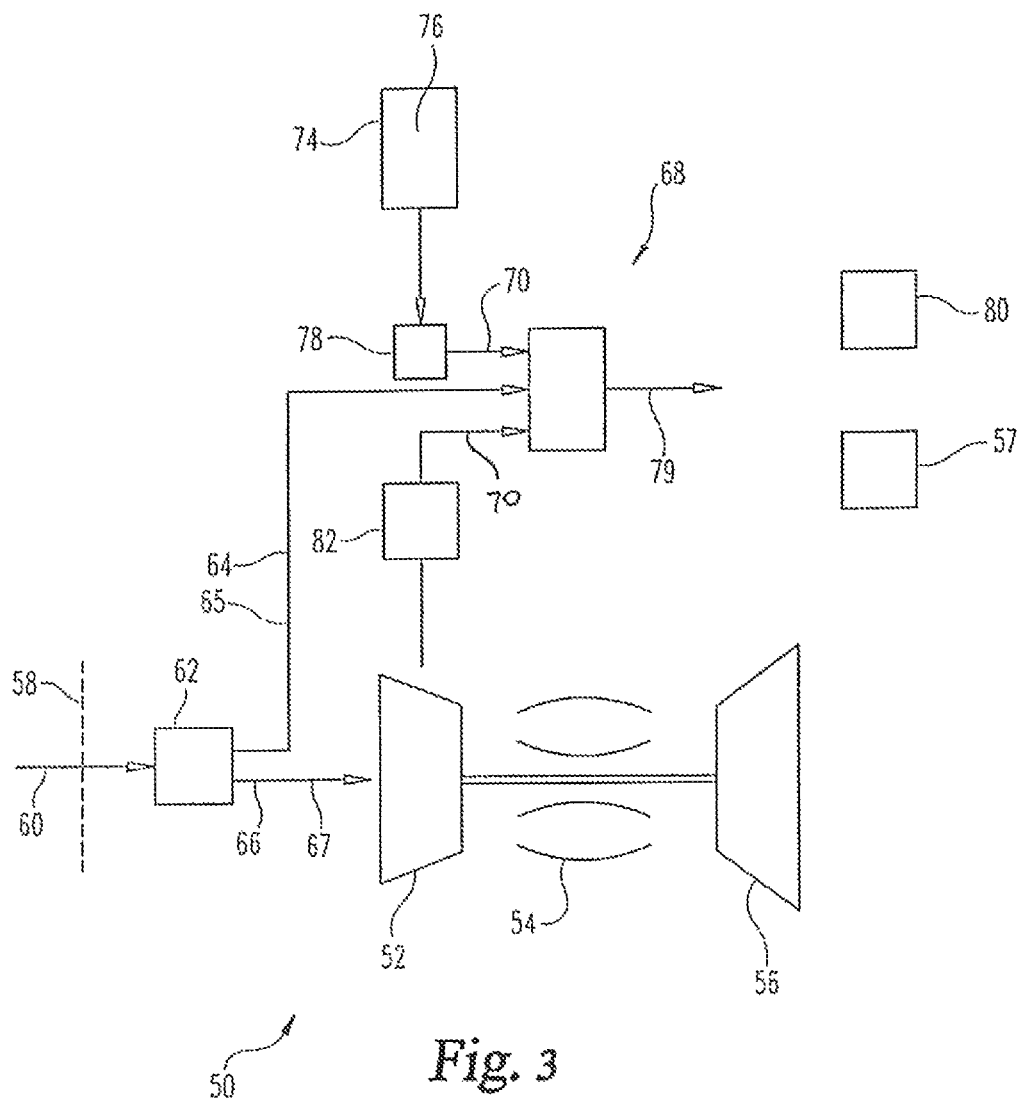
FIG. 3 depicts an embodiment of an air particle separator used with a gas turbine engine.

FIG. 3 discloses an embodiment in which valves 78 and 82 can be moved to permit a flow stream from the gas turbine engine 50 and the container 74. In one mode of operation, the valve 78 can be opened to permit the container fluid 76 to create the flow stream 70 which is used in the ejector 68. In another mode of operation, the valve 82 can be opened to permit fluid from the gas turbine engine 50 to create the flow stream 70 for use in the ejector 68. The container 74 can be recharged after use using a variety of sources as described above.

Although the flow streams 70 from both the gas turbine engine 50 and container 74 are shown as separate streams entering the ejector 68, in some forms, the streams 70 can traverse a common path prior to introduction into the ejector 68. For example, the streams 70 can be merged into a valve which is capable of selecting from the two streams flowing from the gas turbine engine 50 and container 74. In some forms, the valves 78 and 82 can be combined into a single valve from which a flow stream can enter the ejector 68. A three-way valve could be used to select between the flow streams from the gas turbine engine 50 and container 74.

The illustrated embodiment can be operated in a number of different ways. During a starting of the gas turbine engine 50 as the compressor is being rotated to an operating speed, the container 74 can provide the flow stream 70 to the ejector 68 to assist in entraining dirty flow 65 from the particle separator 62. The flow stream 70 can continue to originate from the container 74 for as long as there is sufficient volume of fluid and/or another condition is met and/or an operator chooses to do otherwise. In some embodiments, the system can transition from the container 74 as the source of flow stream 70 and instead use a flow stream 70 from the gas turbine engine 50 to the ejector 68.

Such a transition might occur when the gas turbine engine has reached sufficient rotational speed. In one embodiment, such a speed can be characterized as the point below which a flow stream 70 from the gas turbine engine 50 is insufficient for purposes of attracting dirty flow 65 to the ejector 68, and above which the flow stream 70 from the gas turbine engine 50 is sufficient for purposes of the ejector 68.

In still further embodiments, the container 74 and the gas turbine engine 50 can both contribute a portion of flow stream 70 to be used within the ejector 68. At one or more points during operation of the system, the container 74 can be recharged as described above. To set forth one non-limiting example, the container 74 can be recharged while the gas turbine engine 50 is providing the flow stream 70 to the ejector 68. In some embodiments the gas turbine engine 50 can provide both the flow stream 70 and operate as a source to recharge the container 74.

In one aspect, the present application provides an apparatus comprising a gas turbine engine having an inlet structured to capture an inlet flow stream and deliver it to rotating turbomachinery components of the gas turbine engine, a particle separator having a dirty flow path and a clean flow path, the dirty flow path oriented to withdraw particles from the inlet flow stream, the clean flow path in flow communication with the rotating turbomachinery components, a pressure source separate from the rotating turbomachinery components of the gas turbine engine and capable of producing a flow of pressurized fluid, the pressure source in flow communication with a conduit, and an ejector structured to receive the conduit and the dirty flow path, wherein the pressurized fluid flowing in the conduit is entrained with a dirty flow conveyed in the dirty flow path.

One feature of the present application provides wherein the pressure source is a pressure vessel capable of being charged.

Another feature of the present application further includes a valve disposed between the pressure vessel and the ejector, the valve operable to close off a flow from the pressure vessel to the ejector.

Yet another feature of the present application further includes a controller operable to control the valve, the controller configured to open the valve and permit a flow of pressurized fluid from the pressure vessel during a start of the gas turbine engine.

Still another feature of the present application further includes a vehicle coupled with and capable of receiving power from the gas turbine engine, and which further includes a valve to discourage a flow of pressurized fluid in the conduit and in which the ejector is structured to receive a pressurized fluid from the gas turbine engine.

Yet still another feature of the present application provides wherein the pressurized fluid flowing through the ejector is at a relatively low pressure relative to the dirty flow flowing through the ejector such that the pressurized fluid attracts the dirty flow.

Another aspect the present application provides an apparatus comprising a gas turbine engine having turbomachinery rotatable about a shaft axis and operable to produce a gas turbine engine flow, the gas turbine engine including a starting state and an operating state, particle separator having a dirty flow path and a clean flow path, the dirty flow path structured to convey a dirty flow away from the gas turbine engine and the clean flow path structured to convey a clean flow to the turbomachinery of the gas turbine engine, and an ejector having a first flow path and a second flow path, the first flow path structured to receive the dirty flow of the particle separator, the second flow path structured to convey a working fluid to be entrained with the dirty flow path by ejector action, the second flow path structured to receive a first source working fluid from a first source during the starting of the gas turbine engine and structured to receive a second source working fluid from a second source during the operating state.

A feature of the present application provides wherein the first source is a flow producing device and is coupled with a valve having first position that produces a first flow rate from the flow producing device and a second position that produces a second flow rate.

Another feature of the present application provides wherein the valve is oriented at the second position during the operating state, the second position resulting in a lower flow rate than the first position.

Yet another feature of the present application provides wherein the flow producing device includes a wall enclosing an open interior sized to store a pressurized fluid.

Still another feature of the present application provides wherein the second source is the gas turbine engine and the second source working fluid is the gas turbine engine flow.

Yet still another feature of the present application provides wherein the starting of the gas turbine engine is characterized by a speed below an operating threshold.

A further feature of the present application provides wherein the first source provides first source working fluid during an entire engine start sequence.

A still further feature of the present application provides wherein the first source working fluid and the second source working fluid are air.

Still another aspect the present application provides an apparatus comprising a gas turbine engine having turbomachinery components and an engine air particle separator for separating matter from an inlet air flow to create a dirty flow path and a clean flow path, the clean flow path structured to deliver a clean flow to be used with the turbomachinery components, the dirty flow path conveying a dirty flow, and means for entraining the dirty flow with a source flow from an engine start air source, the source flow independent of the clean flow.

A feature of the present application provides wherein the means includes a means for flowing the source flow.

In still another aspect the present application provides a method comprising starting a gas turbine engine including accelerating a rotatable compressor, activating a flow source apart from the rotatable compressor of the gas turbine engine to provide an ejector flow, forming a clean flow and a dirty flow downstream of an inlet of the gas turbine engine, routing the clean flow to the accelerating compressor, and entraining the dirty flow with the ejector flow.

A feature of the present application provides wherein the activating includes actuating a valve to permit a pressurized tank to vent working fluid to create the ejector flow.

Another feature of the present application further includes closing the valve to minimize a flow of working fluid from the pressurized tank.

Yet another feature of the present application further includes transitioning the ejector flow from the pressurized tank to a separate source of the gas turbine engine.

Still another feature of the present application provides wherein the entraining includes lowering a pressure of the ejector flow.

While the invention has been illustrated and described in detail in the drawings and foregoing description, the same is to be considered as illustrative and not restrictive in character, it being understood that only the preferred embodiments have been shown and described and that all changes and modifications that come within the spirit of the disclosure are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the disclosure, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. An apparatus comprising:
    a gas turbine engine having an inlet structured to capture an inlet flow stream and deliver it to rotating turbomachinery components of the gas turbine engine;
    a particle separator having a dirty flow path and a clean flow path, the dirty flow path oriented to withdraw particles from the inlet flow stream, the clean flow path in flow communication with the rotating turbomachinery components;
    a pressure source separate from the rotating turbomachinery components of the gas turbine engine and capable of producing a flow of pressurized fluid, the pressure source in flow communication with a conduit; and
    an ejector structured to receive the conduit and the dirty flow path, wherein the pressurized fluid flowing in the conduit is entrained with a dirty flow conveyed in the dirty flow path.

2. The apparatus of claim 1 wherein the pressure source is a pressure vessel capable of being charged.

3. The apparatus of claim 2, further comprising a valve disposed between the pressure vessel and the ejector, the valve operable to close off a flow from the pressure vessel to the ejector.

4. The apparatus of claim 3, further comprising a controller operable to control the valve, the controller configured to open the valve and permit a flow of pressurized fluid from the pressure vessel during a start of the gas turbine engine.

5. The apparatus of claim 1, further comprising a vehicle coupled with and capable of receiving power from the gas turbine engine, and which further includes a valve to discourage a flow of pressurized fluid in the conduit and in which the ejector is structured to receive a pressurized fluid from the gas turbine engine.

6. The apparatus of claim 1, wherein the pressurized fluid flowing through the ejector is at a relatively low pressure relative to the dirty flow flowing through the ejector such that the pressurized fluid attracts the dirty flow.

7. An apparatus comprising:
    a gas turbine engine having turbomachinery rotatable about a shaft axis and operable to produce a gas turbine engine flow, the gas turbine engine including a starting state and an operating state;
    a particle separator having a dirty flow path and a clean flow path, the dirty flow path structured to convey a dirty flow away from the gas turbine engine and the clean flow path structured to convey a clean flow to the turbomachinery of the gas turbine engine; and
    an ejector having a first flow path and a second flow path, the first flow path structured to receive the dirty flow of the particle separator, the second flow path structured to convey a working fluid to be entrained with the dirty flow path by ejector action, and the second flow path structured to receive a first source working fluid from a first source during the starting of the gas turbine engine and structured to receive a second source working fluid from a second source during the operating state.

8. The apparatus of claim 7, wherein the first source is a flow producing device and is coupled with a valve having first position that produces a first flow rate from the flow producing device and a second position that produces a second flow rate.

9. The apparatus of claim 8, wherein the valve is oriented at the second position during the operating state, the second position resulting in a lower flow rate than the first position.

10. The apparatus of claim 9, wherein the flow producing device includes a all enclosing an open interior sized to store a pressurized fluid.

11. The apparatus of claim 7, wherein the second source is the gas turbine engine and the second source working fluid is the gas turbine engine flow.

12. The apparatus of claim 7, wherein the starting of the gas turbine engine is characterized by a speed below an operating threshold.

13. The apparatus of claim 12, wherein the first source provides first source working fluid during an entire engine start sequence.

14. The apparatus of claim 12, wherein the first source working fluid and the second source working fluid are air.

15. An apparatus comprising:
a gas turbine engine having turbomachinery components and an engine air particle separator for separating matter from an inlet air flow to create a dirty flow path and a clean flow path, the clean flow path structured to deliver a clean flow to be used with the turbomachinery components, the dirty flow path conveying a dirty flow; and
means for entraining the dirty flow with a source flow from an engine start air source, the source flow independent of the clean flow.

16. The apparatus of claim 15, wherein the means includes a means for flowing the source flow.

17. A method comprising:
starting a gas turbine engine including accelerating a rotatable compressor;
activating a flow source apart from the rotatable compressor of the gas turbine engine to provide an ejector flow;
forming a clean flow and a dirty flow downstream of an inlet of the gas turbine engine;
routing the clean flow to the accelerating compressor; and
entraining the dirty flow with the ejector flow.

18. The method of claim 17, wherein the activating includes actuating a valve to permit a pressurized tank to vent working fluid to create the ejector flow.

19. The method of claim 18, further comprising closing the valve to minimize a flow of working fluid from the pressurized tank.

20. The method of claim 18, further comprising transitioning the ejector flow from the pressurized tank to a separate source of the gas turbine engine.

* * * * *